May 22, 1956 R. M. PEEPLES 2,747,148
CONTROL SYSTEM FOR REEL MOTOR WITH VARIABLE
ARMATURE CURRENT AND FIELD FLUX
Filed Sept. 8, 1951 2 Sheets-Sheet 1

Inventor
Robert M. Peeples
by Walter L. Madden Jr.
Attorney

May 22, 1956 R. M. PEEPLES 2,747,148
CONTROL SYSTEM FOR REEL MOTOR WITH VARIABLE
ARMATURE CURRENT AND FIELD FLUX
Filed Sept. 8, 1951 2 Sheets-Sheet 2

Inventor
Robert M. Peeples
by Walter J. Madden, Jr.
Attorney

United States Patent Office 2,747,148
Patented May 22, 1956

2,747,148

CONTROL SYSTEM FOR REEL MOTOR WITH VARIABLE ARMATURE CURRENT AND FIELD FLUX

Robert M. Peeples, Milwaukee, Wis., assignor to Allis-Chalmers Manufacturing Company, Milwaukee, Wis.

Application September 8, 1951, Serial No. 245,748

18 Claims. (Cl. 318—6)

This invention relates in general to electric motor control systems and in particular to motor control systems utilized in connection with the winding of strip material on a reel.

One of the most common types of control system for controlling a reel on which strip steel is being wound under tension is the system in which the reel motor armature current is maintained constant under variable voltage and the reel motor field current and field flux are increased as the strip builds up on the reel to decrease the motor speed and to increase the motor torque to provide constant strip tension. Such a system is satisfactory where only small coils of strip are desired so that the motor speed range from empty reel to full reel is not excessive. However, where large coils of strip are desired, as is now the case in most mills, it becomes impractical to build reel motors having the desired speed range by field control alone. It therefore is necessary to provide a system of reel motor control which provides the desired motor speed range and which still retains the advantages of the variable voltage drive.

One of the most suitable ways of avoiding the above objections is to vary both the reel motor armature current and field current, either successively or simultaneously, as the strip builds up on the reel.

It is therefore an object of this invention to provide an improved control system for an electric motor driving a reel upon which a strip of material is being wound.

It is an additional object of this invention to provide a control system for a reel motor which provides an improved range of speed control of the motor.

It is a further object of the present invention to provide an improved reel motor control system in which the motor armature current and field current are varied, either simultaneously or successively, to control the motor.

Objects and advantages other than those set forth above will be apparent from the following description when read in connection with the accompanying drawing, in which:

Fig. 1 diagrammatically illustrates the circuits and apparatus of the preferred embodiment of the invention;

Fig. 2 diagrammatically illustrates the circuits and apparatus of an alternate embodiment of the invention;

Figure 1:
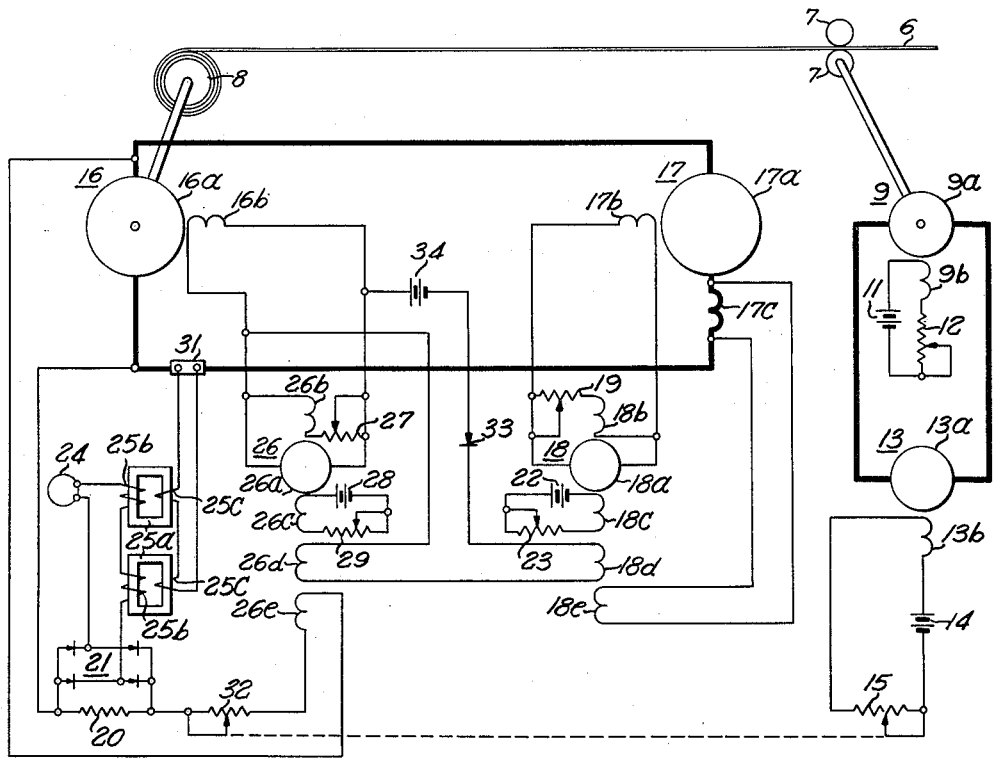

Referring to Fig. 1, the invention is illustrated in connection wtih the control of a strip of material 6 being worked by a work device, such as the rolls 7 of one stand of a rolling mill, and wound on a reel 8. Rolls 7 are driven by any suitable known means such as a motor 9 having an armature winding 9a and a field winding 9b. Field winding 9b is supplied with current from a battery 11 through an adjustable resistor 12, and armature 9a is supplied with current from the armature 13a of a generator 13 having a field winding 13b. Field winding 13b is supplied with current from a battery 14 through a speed adjusting rheostat 15.

Reel 8 is driven by a motor 16 having an armature 16a and a field winding 16b. Armature 16a is supplied with current from any suitable direct current source such as the armature 17a of a direct current generator 17 having a field winding 17b and an interpole winding 17c. Field winding 17b is supplied with current from the armature 18a of an exciter generator 18 having a self-energized field winding 18b and a plurality of control field windings 18c, 18d, 18e. Field winding 18b is connected across armature 18a in series with an adjustable resistor 19, and field winding 18c is energized from a suitable source of reference voltage, such as a battery 22, through an adjustable resistor 23. Field winding 18e, which acts differentially with respect to winding 18c, is connected across interpole winding 17c to be energized by a measure of the armature current of motor 16.

Field winding 16b of motor 16 is energized from the armature 26a of a second exciter generator 26 having a self-energized field winding 26b connected across armature 26a in series with an adjustable resistor 27, and having a plurality of control field windings 26c, 26d, 26e. Field winding 26c is energized from a suitable source of substantially constant reference voltage, such as a battery 28, through an adjustable resistor 29. Field winding 26e is connected across armature 16a in series with a pair of resistors 20, 32. Resistor 20 is connected across the direct current terminals of a full wave rectifier 21 having its alternating current terminals connected in series with a source of alternating current 24 and the reactance winding 25b of a saturable reactor 25. Reactor 25 has a pair of saturable cores 25a and a control winding 25c connected to a shunt 31 in the circuit of armature 16a to impress across rectifier 21 and resistor 20 a voltage proportional to the IR drop of motor 16. The adjustable tap of resistor 32 is ganged for common movement with the adjustable tap of speed adjusting rheostat 15, as shown by the dotted line, so that the resistance of resistor 32 varies in accordance with variations in the speed setting of strip 6. The voltage of resistor 20 acts differentially with respect to the voltage of armature 16a, so that the energization of field winding 26e is jointly dependent upon the counterelectromotive force of motor 16 and the speed of strip 6.

Field winding 26d is connected in series with field winding 18d, a rectifier 33 and a battery 34 across the armature 26a of exciter generator 26. Rectifier 33 is so poled as to permit current flow through field windings 18d, 26d only when the voltage of armature 26a exceeds the voltage of battery 34.

In operation, strip 6 is threaded through rolls 7 and secured to empty reel 8 by any suitable known means (not shown), and the strip is then ready to be wound on reel 8 under tension. Resistors 19, 27 are adjusted so that field windings 18b, 26b provide all of the excitation required to maintain the voltages of armatures 18a, 26a at any given value. When the current in armature 16a and interpole winding 17c has the desired value, the energization of field winding 18e is equal and opposite to the energization of reference winding 18c so that the net energization of these windings is zero and field winding 18b maintains the voltage of armature 18a at the required value. Likewise, when the counterelectromotive force of armature 16a has the desired value, the energization of winding 26e is equal and opposite to the energization of reference field winding 26c, and field winding 26b maintains the voltage of armature 26a at the required value. At the start of the winding operation, the current in field winding 16b is adjusted to a predetermined minimum or "weak field" value. As the strip winds up on reel 8, the speed of motor 16 decreases and the armature current of motor 16 tends to increase, thereby tending to increase the current through interpole winding 17c. However, this action increases the energization of field winding 18e above the energization of reference field winding 18c, to reduce the voltage of armature 18a and thereby reduce the energization of field winding 17b. This action in turn reduces the voltage of armature 17a to return the current in interpole winding 17c and armature 16a to the desired value.

The above described decrease in the speed of motor 16, with a given value of excitation of field winding 16b, results in a decrease in the counterelectromotive force of armature 16a. This action causes the energization of reference field winding 26c to exceed the energization of field winding 26e so that the voltage of armature 26a is increased to increase the energization of field winding 16b above the "weak field" energization of this field winding at the start of the rolling under tension. This increase in the energization of field winding 16b produces the increased torque required in motor 16 to maintain constant tension in strip 6 as the strip builds up on the reel. The increased energization of field winding 16b also increases the counterelectromotive force of armature 16a to the desired constant value so that the energization of field winding 26e again equals the energization of reference field winding 26c, and field winding 26b maintains the voltage of armature 26a at the desired value.

The above described joint action of generators 18, 26 to maintain constant armature current and constant counterelectromotive force of motor 16 continues as the strip builds up on reel 8. Thus, the current in field winding 16b is increased in response to build up of the strip on the reel. During the preceding action, the voltage of armature 26a is below the voltage of battery 34 so that rectifier 33 prevents the flow of current through field windings 18d, 26d. Assuming that the ratio of full reel diameter to empty reel diameter exceeds the ratio of speed range available in motor 16 by field control alone, at a predetermined diameter of the coil of strip on reel 8 the maximum effective field current in field winding 16b is reached at which the field structure becomes saturated. Beyond this value of field current, even large changes in field current produce only inappreciable changes in the flux and speed of motor 16, so that field control of motor 16 is no longer suitable.

The voltage of battery 34 is chosen so as to be equal to the voltage of armature 26a when armature 26a is supplying the above maximum effective field current to field winding 16b. When the voltage of armature 26a tends to exceed this ceiling or maximum value, rectifier 33 permits current to flow through field windings 18d, 26d. Field winding 18d acts cumulatively with respect to reference field winding 18c, so that energization of winding 18d results in an increase in the value of current through armature 16a and interpole winding 17c for which generator 18 regulates. Field winding 26d acts differentially with respect to reference field 26c, so that energization of field winding 26d acts to reduce the value of counterelectromotive force of armature 16a for which generator 26 regulates.

Thus, as the strip 6 builds up on reel 8 above the predetermined diameter, motor 16 continues to slow down to produce a consequent decrease in the counterelectromotive force of armature 16a and the armature current of motor 16 increases, since the lineal speed of the strip is maintained constant by motor 9. This decrease in the counterelectromotive force of motor 16 decreases the energization of field winding 26e to increase the voltage of amature 26a and the current through field winding 16b. The circuits of field windings 18d, 26d both have low resistances so that only a small increase in the voltage of armature 26a above the voltage of battery 34 supplies a substantial current to windings 18d, 26d. This increase in current in winding 16b does not substantially increase the flux of motor 16, owing to the saturation of the motor field circuit, so that the counterelectromotive force of armature 16a does not return to its previous constant value. The above described increase in voltage of armature 26a further increases the current in field windings 18d, 26d to thereby further increase the current in armature 16a. This increase in armature current provides motor 16 with the additional torque required to maintain constant tension in strip 6 as the reel diameter increases to full reel.

During the entire build up of the strip on the reel, from empty reel to full reel, the horsepower output of motor 16 is maintained substantially constant. That is, the motor torque is increased as the strip builds up on the reel to maintain constant strip tension with increasing reel diameter, and the rotative speed of motor 16 is correspondingly reduced during reel build up to maintain constant lineal strip speed.

Figure 2:
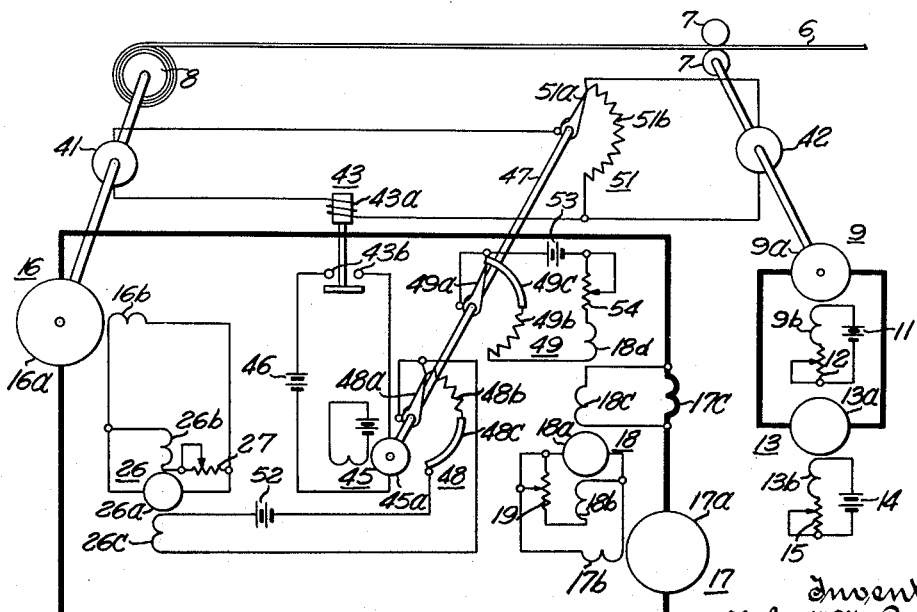

In the embodiment illustrated in Fig. 2, a tachometer generator 41 driven by motor 16 is utilized to provide a voltage proportional to the speed of reel 8. A similar tachometer generator 42 is driven by motor 9 to produce a voltage proportional to the speed of strip 6. A relay 43 has an energizing coil 43a connected in circuit with tachometer generators 41, 42 to be energized in response to a predetermined difference between the voltages of the tachometer generators. Contacts 43b of relay 43, when closed, connect the armature 45a of a motor 45 to a battery 46 to cause rotation of the motor. Armature 45a drives a shaft 47 to which is secured a plurality of adjustable taps 48a, 49a, 51a. Taps 48a, 49a, 51a are associated with three rings 48, 49, 51, respectively, of a motor operated rheostat driven by motor 45. Ring 48 comprises a resistive section 48b and a section 48c of negligible resistance serially connected therewith. Ring 49 comprises a resistive section 49b and a serially connected section 49c of negligible resistance. The noncommon terminals of sections 48b, 48c are connected to field winding 26c of exciter 26 through a suitable source of reference voltage, such as a battery 52, so that movement of tap 48a varies the current through field winding 26c. Similarly, the noncommon terminals of sections 49b, 49c are connected to field winding 18d of exciter 18 in series with a battery 53 and a tension adjusting resistor 54 to vary the current in winding 18d in response to movement of tap 49a.

Ring 51 of the motor operated rheostat comprises a single resistive section 51b connected across the armature terminals of tachometer generator 42. One armature terminal of tachometer generator 41 is connected to the lower terminal of section 51b and the other armature terminal thereof is connected to tap 51a to impress on relay coil 43a the difference between the voltage of tachometer generator 41 and an adjustable portion of the voltage of tachometer generator 42.

Prior to the start of winding strip 6 on reel 8, the elements of the motor operated rheostat are in the position shown in the drawing, and the voltages of generators 41, 42 are equal so that relay 43 is deenergized. As the strip starts to wind on reel 8, motor 16 slows down under the load so that the voltage of generator 41 is less than the voltage of generator 42, causing coil 43a to close contacts 43b to energize motor armature 45a. Motor 45 thereupon rotates shaft 47 to cause tap 48a to decrease the amount of resistive section 48b connected in circuit with battery 52 and field winding 26c to thereby increase the current in field winding 26c. This action successively increases the voltage of armature 26a and the current in field winding 16b. Movement of shaft 47 also causes tap 49a to traverse the section 49c of negligible resistance of ring 49, but this action does not change the energization of field winding 18c, so that differentially acting field windings 18c, 18d regulate for a constant current in interpole winding 17c and armature 16a.

Movement of shaft 47 also causes tap 51a to traverse section 51b to reduce the portion of the voltage of generator 42 which is impressed across relay coil 43a. When the voltage of the adjustable portion of section 51b has been reduced a predetermined amount, relay coil 43a is not sufficiently energized to remain picked up and the relay therefore drops out to deenergize motor 45 to stop the movement of shaft 47. As the strip continues to build up on reel 8, motor 16 continues to slow down so that relay 43 is again energized to connect armature 45a to battery 46. The regulating action described above commences again to increase the current in field winding 16b and to maintain constant current in armature 16a. In practice, the operation of motor 45 would be practically continuous, owing to the speed with which the strip builds up on reel 8.

Thus, during the above described regulating action the armature current of motor 16 is maintained substantially constant and the current in field winding 16b is increased as the strip builds up on reel 8 to increase the motor torque to maintain constant tension in strip 6.

When the coil on reel 8 reaches a predetermined diameter, increases in current in field winding 16b are no longer effective to produce appreciable flux increases in the motor field circuit. The motor operated rheostat is so designed that when this predetermined diameter is reached, tap 48a is moving from section 48b to section 48c and tap 49a is moving from section 49c to section 49b. Therefore, as the strip builds up above the predetermined diameter, tap 48a traverses section 48c and tap 49a traverses section 49b. This action results in maintaining the current in field winding 16b constant and in progressively increasing the current in field winding 18d as the strip builds up above the predetermined diameter to thereby progressively increase the current in armature 16a and interpole 17c for which generator 18 regulates. Thus, the embodiment of Fig. 2 operates in a manner similar to that described above in Fig. 1 to maintain constant armature current and to increase the motor field flux during a predetermined portion of the reel build up, and to maintain constant field flux and to increase the armature current during the remaining portion of the reel build up. During this action, the horsepower output of motor 16 is maintained substantially constant as in the embodiment of Fig. 1.

Figure 3:
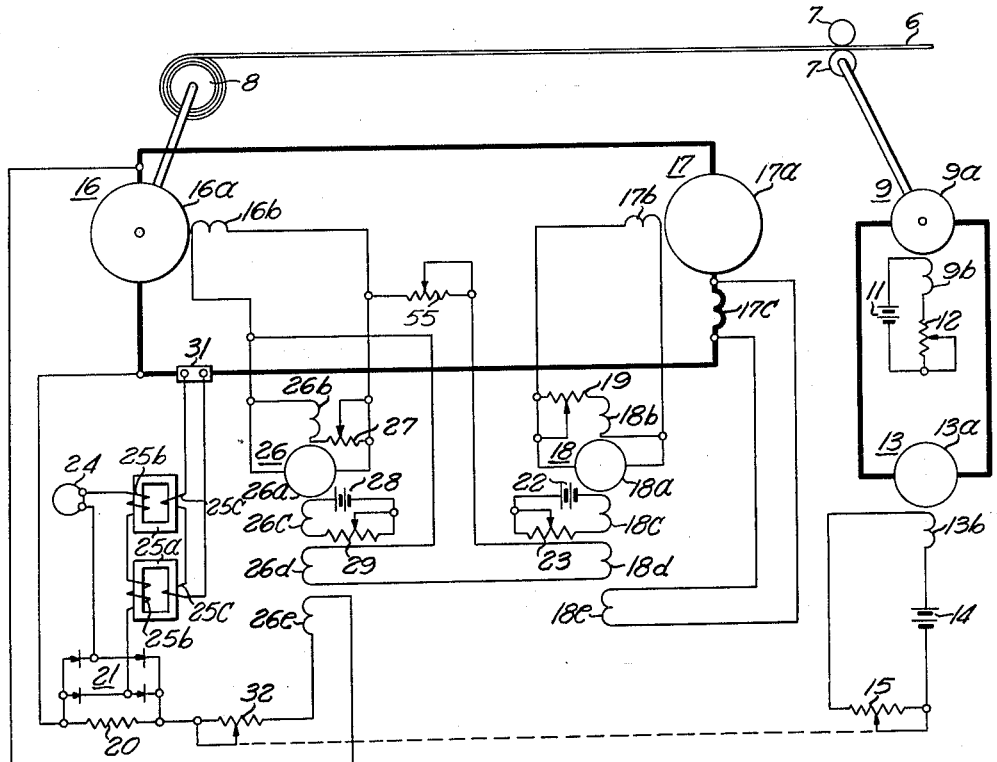
Fig. 3 illustrates an additional alternate embodiment of the invention.

The embodiment illustrated in Fig. 3 is identical to the embodiment illustrated in Fig. 1 except that rectifier 33 and battery 34 of Fig. 1 have been removed and replaced by an adjustable resistor 55. Prior to winding the strip on reel 8, the energization of field winding 26c is adjusted to be equal and opposite to the total energization of field windings 26d, 26e, so that field winding 26b maintains the voltage of armature 26a at the value required to provide the "weak field" energization of field winding 16b. Similarly, the energization of field winding 18c is adjusted to be equal and opposite to the total energization of field windings 18d, 18e, so that field winding 18b produces in armature 18a the voltage required to maintain the current in armature 16a at the desired value. When the strip starts to build up on reel 8, the armature current of motor 16 tends to increase and the counterelectromotive force of armature 16a tends to decrease. This latter action decreases the energization of field winding 26e so that field winding 26c increases the voltage of armature 26a to increase the current and flux of field winding 16b. An increase in the voltage of armature 26a increases the energization of field windings 18d, 26d to thereby increase the current through armature 16a and interpole winding 17c for which generator 18 regulates and to decrease the difference between the energization of field winding 26c and the total energization of field windings 26d, 26e.

Thus, as the strip builds up on reel 8, the current in armature 16a and the current and flux of field winding 16b are progressively increased to increase the torque of motor 16 to maintain constant tension in strip 6. During the build up of the strip on the reel, the counterelectromotive force of motor 16 is decreased to progressively decrease the energization of field winding 26e, but, at the same time, the energization of field winding 26d is progressively increased to maintain a predetermined differential between the energization of field winding 26c and the total energization of field windings 26d, 26e to prevent field winding 26c from immediately increasing the current in field winding 16b to the maximum value. The rate at which the armature current and field flux are thus increased during reel build up may be varied by adjustment of resistor 55. Thus, the tension in strip 6 is maintained substantially constant during reel build up without saturating the field circuit of motor 16, by simultaneously varying the armature current and field flux of motor 16 while maintaining a constant horsepower output of motor 16.

Figure 4:
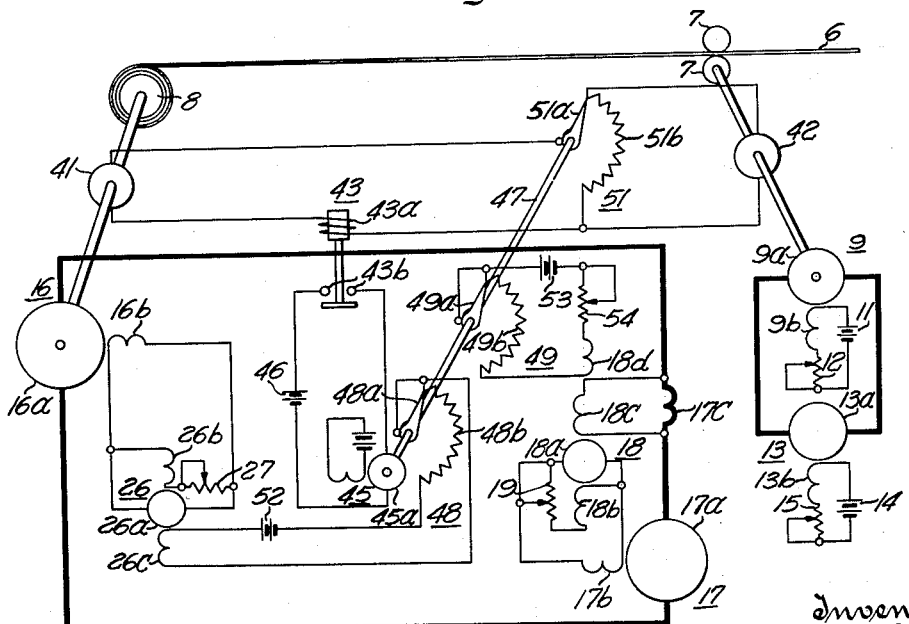
Fig. 4 illustrates an additional alternate embodiment of the invention.

The embodiment illustrated in Fig. 4 is identical to that shown in Fig. 2 except that in Fig. 4 the ring 48 comprises a single resistive section 48b, and the ring 49 comprises a single resistive section 49b. As the strip builds up on reel 8, tap 48a traverses section 48b to increase the current in field winding 26c to thereby progressively increase the current and flux of field winding 16b. Simultaneously therewith, tap 49a traverses section 49b to increase the current in field winding 18d to thereby progressively increase the current in armature 16a. Rings 48, 49 are so designed that the above described simultaneous variations of field current and armature current of motor 16 result in a substantially constant horsepower output of motor 16 at all times during reel build up. These simultaneous variations continue until the strip on the reel reaches full diameter, and the magnetic field circuit of motor 16 does not saturate as in the embodiments shown in Figs. 1 and 2.

Although but four embodiments have been illustrated and described, it will be apparent to those skilled in the art that various changes and modifications may be made therein without departing from the spirit of the invention or from the scope of the appended claims.

It is claimed and desired to secure by Letters Patent:

1. In a system for controlling a strip of material being wound on a reel, the combination of a motor for driving said reel, said motor having an armature winding and a field winding, a first source for supplying current to said armature winding, a second source for supplying current to said field winding to produce flux in said motor, and control means responsive to the value of the horsepower output of said motor independently of the losses in said first source and in said motor for controlling said first and second sources to vary said armature winding current and said flux to maintain the horsepower output of said motor substantially constant during winding of said strip on said reel, whereby the tension in said strip is maintained substantially constant during said winding.

2. In a system for controlling a strip of material being wound on a reel, the combination of a motor for driving said reel, said motor having an armature winding and a field winding, a first source for supplying current to said armature winding, first control means for controlling said source for maintaining said armature winding current substantially constant, second control means for controlling said source to increase said armature winding current, a second source for supplying current to said field winding to produce flux in said motor, third control means for controlling said second source to increase said flux, fourth means for controlling said second source to maintain said flux substantially constant, and means responsive to the value of the horsepower output of said motor independently of the losses in said first source and in said motor for causing said first and said third control means to control said motor as said strip builds up on said reel from empty reel to a predetermined diameter and for causing said second and said fourth control means to control said motor as said strip builds up to full diameter.

3. In a system for controlling a strip of material being wound on a reel, the combination of a motor for driving said reel, said motor having an armature winding and a field winding, a first source for supplying current to said armature winding, first control means for controlling said source to control said armature winding current, a second source for supplying current to said field winding to produce flux in said motor, second control means for controlling said second source to control said flux, means responsive to the value of the horsepower output of said motor independently of the losses in said first source and in said motor for causing said first control means to maintain said armature winding current substantially constant at a predetermined value and for causing said second control means to increase said flux only as said strip builds up on said reel to a predetermined diameter and for causing said first control means to increase said armature winding current above said predetermined value as said strip builds up to full diameter.

4. In a system for controlling a strip of material being wound on a reel, the combination of a motor for driving said reel, said motor having an armature winding and a field winding, a first generator for supplying current to said armature winding, first control means for controlling said first generator to maintain said armature winding current substantially constant at a predetermined value as said strip builds up on said reel to a predetermined diameter, a second generator for supplying current to said field winding to produce flux in said motor, second control means jointly responsive to the counterelectromotive force of said motor and the speed of said strip for controlling said second generator to increase said flux as said strip builds up to said predetermined diameter, and means responsive to the value of the horsepower output of said motor independently of the losses in said first generator and in said motor for increasing said armature winding current above said predetermined value and for maintaining said flux substantially constant as said strip builds up to full diameter.

5. In a system for controlling a strip of material being wound on a reel, the combination of a motor for driving said reel, said motor having an armature winding and a field winding, a first generator for supplying current to said armature winding, means for producing a first control voltage proportional to said armature current, a source of reference voltage, first control means differentially responsive to said control voltage and said reference voltage for controlling said first generator to maintain said armature winding current substantially constant at a predetermined value as said strip builds up on said reel to a predetermined diameter, a second generator for supplying current to said field winding to produce flux in said motor, second control means jointly responsive to the counterelectromotive force of said motor and the speed of said strip for controlling said second generator to increase said flux as said strip builds up to said predetermined diameter, and means responsive to the value of the horsepower output of said motor independently of the losses in said first generator and in said motor for increasing said armature winding current above said predetermined value and for maintaining said flux constant as said strip builds up to full diameter.

6. In a system for controlling a strip of material being wound on a reel, the combination of a motor for driving said reel, said motor having an armature winding and a field winding, a first generator for supplying current to said armature winding, a first control element and a second control element for controlling the voltage of said first generator, means for impressing on said first element a voltage which is a measure of said armature winding current, a first source for impressing on said second element a first reference voltage, a second generator for supplying current to said field winding to produce flux in said motor, a third control element for controlling the voltage of said second generator, a second source for impressing on said third element a second reference voltage, a motor operated rheostat having a first ring and a second ring, said first ring having a first adjustable tap, a first section of negligible resistance and a first resistive section, said second ring having a second adjustable tap, a second section of negligible resistance and a second resistive section, means connecting said first ring in circuit with said first source and said second control element, means connecting said second ring in circuit with said second source and said third control element, and means responsive to the value of the horsepower output of said motor independently of the losses in said first generator and in said motor for controlling said motor operated rheostat, said first adjustable tap traversing said first section of negligible resistance and said second adjustable tap traversing said second resistive section as said strip builds up from empty reel, whereby said armature winding current is maintained substantially constant at a value determined by said first reference voltage and said second reference voltage is increased to increase said flux as said strip builds up to a predetermined diameter, said first adjustable tap traversing said first resistive section and said second adjustable tap traversing said second section of negligible resistance as said strip builds up above said predetermined diameter, whereby said armature current increases above said predetermined value and said flux is maintained substantially constant as said strip builds up from said predetermined diameter to full diameter.

7. In a system for controlling a strip of material being wound on a reel, the combination of a motor for driving said reel, said motor having an armature winding and a field winding, a first generator for supplying current to said armature winding, a first control element and a second control element for controlling the voltage of said first generator, means for impressing on said first element a voltage which is a measure of said armature winding current, a first source for impressing on said second element a first reference voltage, a second generator for supplying current to said field winding to produce flux in said motor, a third control element for controlling the voltage of said second generator, a second source for impressing on said third element a second reference voltage, a motor operated rheostat having a first ring and a second ring, said first ring having a first adjustable tap, a first section of negligible resistance and a first resistive section, said second ring having a second adjustable tap, a second section of negligible resistance and a second resistive section, means connecting said first ring in circuit with said first source and said second control element, means connecting said second ring in circuit with said second source and said third control element, a first tachometer generator driven by said reel for producing a first control voltage proportional to the speed of said reel, a second tachometer generator for producing a second control voltage proportional to the speed of said strip, and a relay responsive to the difference between said first control voltage and an adjustable portion of said second control voltage for controlling said motor operated rheostat, said first adjustable tap traversing said first section of negligible resistance and said second adjustable tap traversing said second resistive section as said strip builds up from empty reel, whereby said armature winding current is maintained substantially constant at a value determined by said first reference voltage and said second reference voltage is increased to increase said flux as said strip builds up to a predetermined diameter, said first adjustable tap traversing said first resistive section and said second adjustable tap traversing said second section of negligible resistance as said strip builds up above said predetermined diameter, whereby said armature winding current increases above said predetermined value and said flux is maintained substantially constant as said strip builds up from said predetermined diameter to full diameter.

8. In a system for controlling a strip of material being wound on a reel, the combination of a motor for driving said reel, said motor having an armature winding and a field winding, a first generator for supplying current to said armature winding, a second generator for controlling the voltage of said first generator, said second generator having a first field winding, a second field winding and a third field winding, means for impressing on said first field winding a voltage proportional to said armature current, means for impressing on said second field winding a first substantially constant reference voltage, said second field winding acting differentially with respect to said first field winding to maintain said armature winding current substantially constant at a predetermined value determined by said reference voltage as said strip builds up on said reel to a predetermined diameter, a third generator for supplying current to said motor field winding to produce flux in said motor, said third generator having first field winding means, second field winding means and third field winding means, means connected to said motor for impressing on said first field winding means a voltage dependent upon the counterelectromotive force of said motor and the speed of said strip, means for impressing on said second field winding means a second substantially constant reference voltage, said first field winding means acting differentially with respect to said second field winding means to increase said flux as said strip builds up to said predetermined diameter, and means responsive to the value of the horsepower output of said motor independently of the losses in said first generator and in said motor for energizing said third field winding to increase said armature winding current above said predetermined value and for energizing said third field winding means to maintain said flux substantially constant as said strip builds up to full diameter.

9. In a system for controlling a strip of material being wound on a reel, the combination of a motor for driving said reel, said motor having an armature winding and a field winding, a first generator for supplying current to said armature winding, a second generator for controlling the voltage of said first generator, said second generator having a first field winding, a second field winding and a third field winding, means for impressing on said first field winding a voltage proportional to said armature winding current, means for impressing on said second field winding a first substantially constant reference voltage, said second field winding acting differentially with respect to said first field winding to maintain said armature winding current substantially constant at a predetermined value determined by said reference voltage as said strip builds up on said reel to a predetermined diameter, a third generator having an armature winding for supplying current to said motor field winding to produce flux in said motor, said third generator having first field winding means, second field winding means and third field winding means, means connected to said motor for impressing on said first field winding means a voltage dependent upon the counterelectromotive force of said motor and the speed of said strip, means for impressing on said second field winding means a second substantially constant reference voltage, said first field winding means acting differentially with respect to said second field winding means to increase the voltage of said third generator armature winding to increase said flux as said strip builds up to said predetermined diameter, a source for producing a third substantially constant reference voltage, means connecting said third field winding and said third field winding means in series with said source across said third generator armature winding to form a first circuit, and a rectifier connected in said first circuit to permit current flow therethrough only when the voltage of said third generator armature winding exceeds said third reference voltage, the voltage of said third generator armature winding exceeding said third reference voltage when said strip builds up above said predetermined diameter, whereby upon build up of said strip above said predetermined diameter said third field winding is energized to increase said armature winding current above said predetermined value and said third field winding means is energized to maintain said flux substantially constant as said strip builds up to full diameter.

10. In a system for controlling a strip of material being wound on a reel, the combination of a motor for driving said reel, said motor having an armature winding and a field winding, a first generator for supplying current to said armature winding, a second generator for controlling the voltage of said first generator, said second generator having a first field winding, a second field winding and a third field winding, means for impressing on said first field winding a voltage proportional to said armature winding current, means for impressing on said second field winding a first substantially constant reference voltage, said second field winding acting differentially with respect to said first field winding to maintain said armature winding current substantially constant at a predetermined value determined by said reference voltage as said strip builds up on said reel to a predetermined diameter, a third generator for supplying current to said motor field winding to produce flux in said motor, said third generator having first field winding means, second field winding means and third field winding means, means connected to said motor for impressing on said first field winding means a voltage dependent upon the counterelectromotive force of said motor, speed adjusting means for varying the speed of said strip, a resistor connected in circuit with said first field winding means, said resistor having an adjustable tap connected to said speed adjusting means to vary the resistance of said resistor in response to variations in the speed of said strip, means for impressing on said second field winding means a second substantially constant reference voltage, said first field winding means acting differentially with respect to said second field winding means to increase said flux as said strip builds up to said predetermined diameter, and means responsive to the value of the horsepower output of said motor independently of the losses in said first generator and in said motor for energizing said third field winding to increase said armature winding current above said predetermined value and for energizing said third field winding means to maintain said flux substantially constant as said strip builds up to full diameter.

11. In a system for controlling a strip of material being found on a reel, the combination of a motor for driving said reel, said motor having an armature winding and a field winding, a first generator for supplying current to said armature winding, a first control element and a second control element for controlling the voltage of said first generator, means for impressing on said first element a voltage which is a measure of said armature winding current, a first source for impressing on said second element a first reference voltage, a second generator for supplying current to said field winding to produce flux in said motor, a third control element for controlling the voltage of said second generator, a second source for impressing on said third element a second reference voltage, a motor operated rheostat having a first ring, a second ring, and a third ring, said first ring having a first adjustable tap, a first section of negligible resistance and a first resistive section, said second ring having a second adjustable tap, a second section of negligible resistance and a second resistive section, said third ring having a third adjustable tap and a third resistive section, means connecting said first ring in circuit with said first source and said second control element, means connecting said second ring in circuit with said third control element, a first tachometer generator driven by said reel for producing a first control voltage proportional to the speed of said reel, a second tachometer generator for producing a second control voltage proportional to the speed of said strip, means connecting said third resistive section across said second tachometer generator to form a voltage divider, a relay connected between said first tachometer generator and said third resistive section to have impressed thereacross the difference between said first control voltage and an adjustbale portion of said second control voltage, and means connecting said motor operated rheostat to be controlled by said relay, said first adjustable tap traversing said first section of negligible resistance and said second adjustable tap traversing said second resistive section as said strip builds up from empty reel, whereby said armature winding current is maintained substantially constant at a value determined by said first reference voltage and said second reference voltage is increased to increase said flux as said strip builds up to a predetermined diameter, said first adjustable tap traversing said first resistive section and said second adjustable tap traversing said second section of negligible resistance as said strip builds up above said predetermined diameter, whereby said armature current increases above said predetermined value and said flux is maintained substantially constant as said strip builds up from said predetermined diameter to full diameter.

12. In a system for controlling a strip of material being wound on a reel, the combination of a motor for driving said reel, said motor having an armature winding and a field winding, a first generator for supplying current to said armature winding, first control means for controlling said first generator, a second generator for supplying current to said field winding to produce flux in said motor, second control means for controlling said second generator, and means responsive to the value of the horsepower output of said motor independently of the losses in said first generator and in said motor for causing said first and second control means to simultaneously increase said armature winding current and said flux as said strip builds up on said reel to maintain a substantially constant horsepower output of said motor as said strip builds up on said reel to full diameter.

13. In a system for controlling a strip of material being wound on a reel, the combination of a motor for driving said reel, said motor having an armature winding and a field winding, a first generator for supplying current to said armature winding, a pair of differentially acting control elements for a controlling the voltage of said first generator, means for impressing on one of said elements a voltage which is a measure of said armature winding current, means for impressing on the other of said elements a first reference voltage, a second generator for supplying current to said field winding to produce flux in said motor, a third control element for controlling the voltage of said second generator, a source for impressing on said third element a second reference voltage, a motor operated rheostat having a first ring and a second ring, said first ring having a first adjustable tap and a first resistive section, said second ring having a second adjustable tap and a second resistive section, means connecting said first ring in circuit with said second control element, means connecting said second ring in circuit with said third control element, and means responsive to the value of the horsepower output of said motor independently of the losses in said first generator and in said motor for controlling said motor operated rheostat, said first adjustable tap traversing said first resistive section and said second adjustable tap traversing said second resistive section as said strip builds up from empty reel, whereby said armature winding current and said flux are simultaneously increased and the speed of said motor is decreased to maintain a substantially constant horsepower output from said motor as said strip builds up on said reel to full diameter.

14. In a system for controlling a strip of material being wound on a reel, the combination of a motor for driving said reel, said motor having an armature winding and a field winding, a first generator for supplying current to said armature winding, a second generator for controlling the voltage of said first generator, said second generator having a first field winding, a second field winding and a third field winding, means for impressing on said first field winding a voltage proportional to said armature winding current, means for impressing on said second field winding a first substantially constant reference voltage, said second and said third field windings acting differentially with respect to the first field winding, a third generator for supplying current to said motor field winding to produce flux in said motor, said third generator having an armature winding and first field winding means, second field winding means and third field winding means, means connected to said motor for impressing on said first field winding means a voltage dependent upon the counterelectromotive force of said motor and the speed of said strip, means for impressing on said second field winding means a second substantially constant reference voltage, said first and said third field winding means acting differentially with respect to said second field winding means, means connecting said third field winding and said third field winding means in series across said armature winding of said third generator, and means responsive to the value of the horsepower output of said motor independently of the losses in said first generator and in said motor for increasing the voltage of said third generator armature winding to increase the energization of said third field winding and said third field winding means, whereby said flux and said armature winding current are progressively increased as said strip builds up on said reel to maintain a substantially constant horsepower output of said motor and to maintain substantially constant tension in said strip.

15. In a system for controlling a strip of material being wound on a reel, the combination of a motor for driving said reel, said motor having an armature winding and a field winding, a first generator for supplying current to said armature winding, first control means for controlling said first generator, a second generator for supplying current to said field winding to produce flux in said motor, second control means for controlling said second generator, and means responsive to the value of the horsepower output of said motor independently of the losses in said first generator and in said motor for causing said first and second control means to increase said flux and said armature winding current as said strip builds up on said reel in such a manner as to maintain a substantially constant horsepower output of said motor during winding of said strip on said reel.

16. In a system for controlling a strip of material being wound on a reel, the combination of a motor for driving said reel, said motor having an armature winding and a field winding, a generator for supplying current to said armature winding, first control means for controlling said generator to control said armature winding current, a source for supplying current to said field winding to produce flux in said motor, second control means for controlling said source to control said flux, said first and second control means being responsive to the value of the horsepower output of said motor independently of the losses in said generator and in said motor for controlling said generator and said source to maintain the horsepower output of said motor substantially constant during winding of said strip on said reel.

17. In a system for controlling a strip of material being wound on a reel, the combination of a motor for driving said reel, said motor having an armature winding and a field winding, a first source for supplying current to said armature winding, a second source for supplying current to said field winding to produce flux in said motor, and control means responsive to the current in and the counter-electromotive force of said armature winding for controlling said first and second sources to vary said armature winding current and said flux to maintain the horsepower output of said motor substantially constant during winding of said strip on said reel.

18. In a system for controlling a strip of material wound on a reel, the combination of a motor for driving said reel, said motor having an armature winding and a field winding, a first source for supplying current to said armature winding, a second source for supplying current to said field winding to produce flux in said motor, and control means responsive to the current in said armature winding and to the speed of said motor for controlling said first and second sources to vary said armature winding current and said flux to maintain the horsepower output of said motor substantially constant during winding of said strip on said reel.

References Cited in the file of this patent

UNITED STATES PATENTS

| 1,165,788 | Lilsenroth | Dec. 28, 1915 |
| 2,295,395 | Formhals | Sept. 8, 1942 |
| 2,363,377 | Wrathall | Nov. 21, 1944 |
| 2,468,117 | Schaelchlin | Apr. 26, 1949 |
| 2,500,753 | Higgs | Mar. 14, 1950 |
| 2,550,104 | Allbert | Apr. 24, 1951 |
| 2,629,845 | Pabst | Feb. 24, 1953 |